United States Patent
Ogasawara et al.

(10) Patent No.: US 7,613,349 B2
(45) Date of Patent: Nov. 3, 2009

(54) IMAGE PROCESSING APPARATUS AND METHOD

(75) Inventors: Shino Ogasawara, Kawasaki (JP); Shunichiro Nonaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 693 days.

(21) Appl. No.: 11/442,299

(22) Filed: May 30, 2006

(65) Prior Publication Data

US 2006/0267809 A1 Nov. 30, 2006

(30) Foreign Application Priority Data

May 31, 2005 (JP) .............................. 2005-159533

(51) Int. Cl.
G06K 9/36 (2006.01)
H03M 7/00 (2006.01)
G06K 9/46 (2006.01)

(52) U.S. Cl. .................... 382/233; 382/246; 341/50

(58) Field of Classification Search ................. 382/173, 382/218, 219, 232, 233, 244–246, 248, 250, 382/251, 298, 299; 341/50; 375/240.03, 375/240.16, 240.23, E7.198, E7.211; 348/415.1; 358/261.4, 432

See application file for complete search history.

(56) References Cited

U.S. PATENT DOCUMENTS

| 5,467,086 | A | * | 11/1995 | Jeong ........................... 341/50 |
|---|---|---|---|---|
| 5,754,699 | A | * | 5/1998 | Sugahara ..................... 382/233 |
| 5,832,128 | A | * | 11/1998 | Suzuki ........................ 382/246 |
| 5,883,678 | A | * | 3/1999 | Yamaguchi et al. ....... 348/390.1 |
| 5,901,250 | A | * | 5/1999 | Ohara ......................... 382/246 |
| 6,005,623 | A | * | 12/1999 | Takahashi et al. ....... 375/240.16 |
| 2004/0105119 | A1 | | 6/2004 | Nonaka |
| 2006/0039478 | A1 | * | 2/2006 | Nonaka .................. 375/240.23 |
| 2006/0267809 | A1 | * | 11/2006 | Ogasawara et al. ........... 341/50 |

FOREIGN PATENT DOCUMENTS

JP 2003-032482 1/2003

* cited by examiner

*Primary Examiner*—Amir Alavi
(74) *Attorney, Agent, or Firm*—McGinn IP Law Group, PLLC

(57) ABSTRACT

An image processing method and apparatus capable of decoding and reducing image data encoded with an orthogonal transformation and a variable length decoding in high speed without degrading the accuracy of the reduced image data. In the method and apparatus, the image data are decoded by a variable length decoding and an inverse orthogonal transformation, and reduced to a predetermined target resolution. The image data are decoded by the variable length decoding and resolution of the decoded image data is obtained. Then, the obtained resolution is compared with the target resolution to select the low frequency components to be used for the inverse orthogonal transformation based on the comparison result. Thereafter, an optimum reduction method is selected based on the comparison result, and the decoded image data are reduced by the selected reduction method.

9 Claims, 2 Drawing Sheets

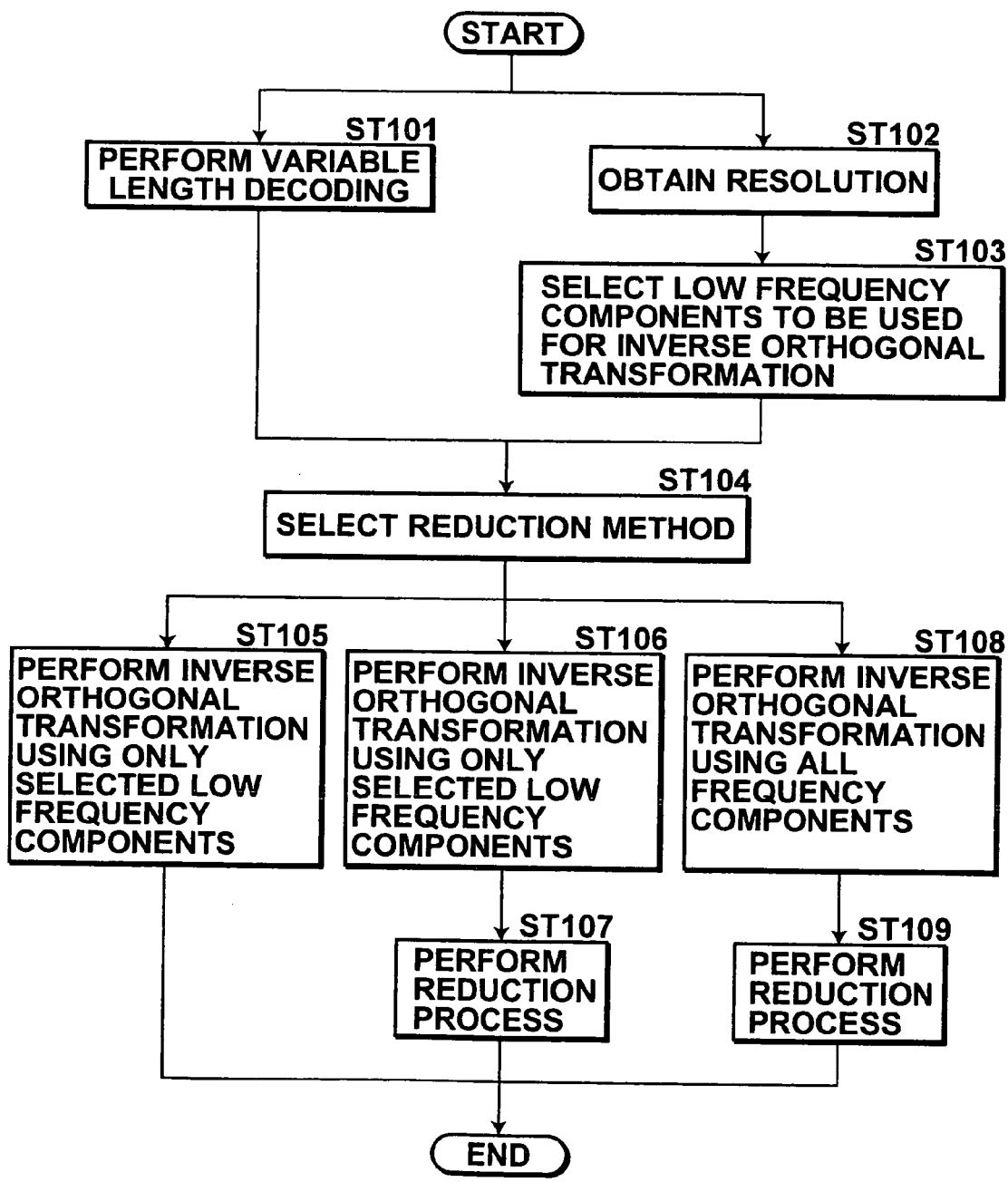

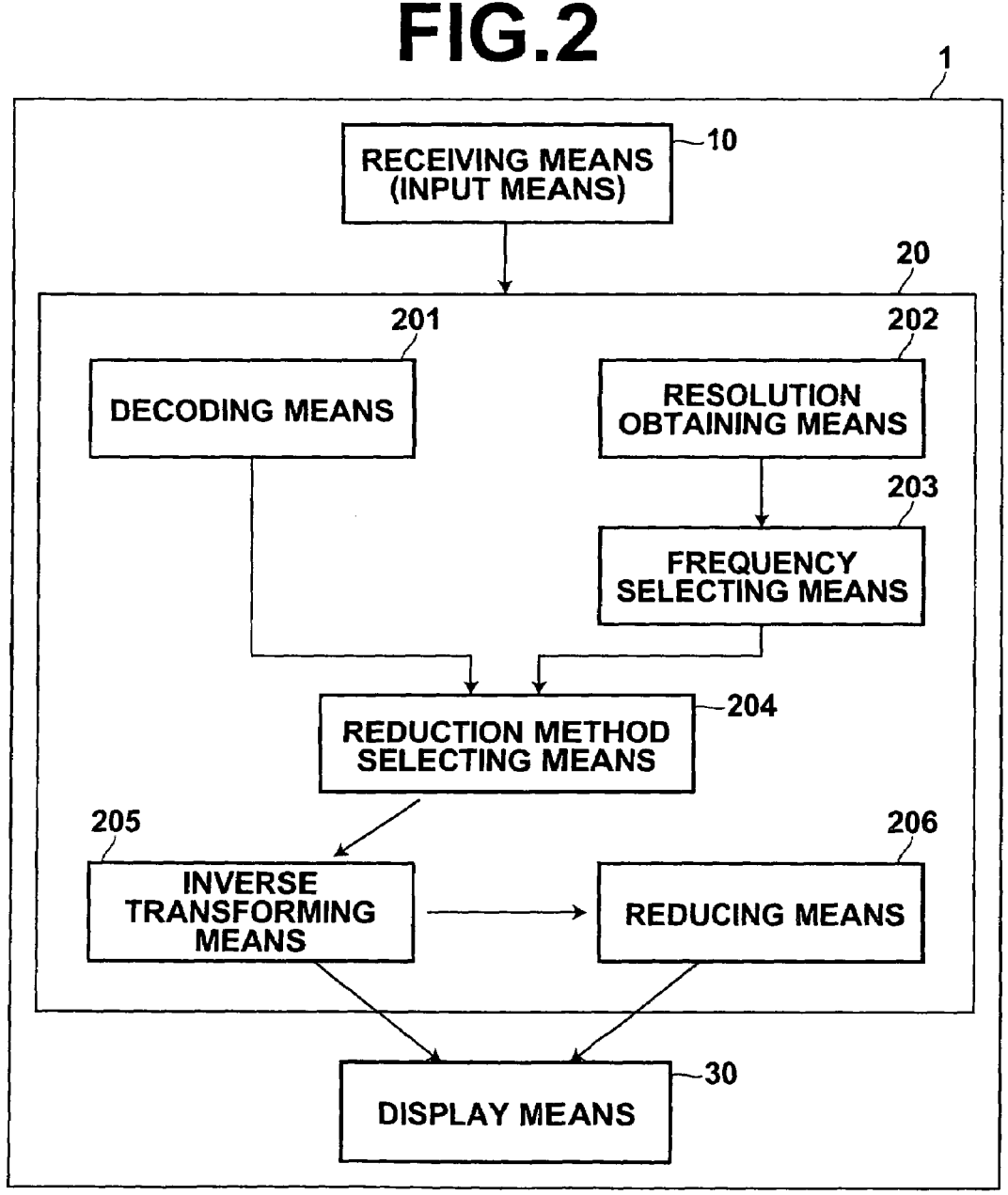

IMAGE PROCESSING APPARATUS AND METHOD

BACKGROUND OF THE INVENTION

1. Field of the Invention

The present invention relates to an image processing apparatus and method in which encoded image data are reduced to an appropriate resolution in high speed when the image data are decoded for display or the like.

2. Description of the Related Art

Recently, digital cameras and other imaging devices have evolved to be able to readily obtain mega pixel size images, and the image data of such images are distributed in large amounts on the Internet and the like. It has been a problem that it takes a prolonged time for processing such large image data when displaying, generating, or distributing them. As such, various methods and systems for processing image data in higher speed are proposed.

For example, U.S. Patent Application Publication No. 20040105119 discloses a relay station that performs image processing on an image obtained by a communication device's camera, such as a cell phone or the like and sent to a receiver by attaching it to an e-mail, thereby the resolution of the image and the like are adjusted according to the specifications of the communication device's camera of the receiver. In this way, the patent publication described above proposes a method for minimizing image quality variations arising from the difference in the capabilities between the cameras of the sender and receiver by processing the image data using the devices provided in the relay station.

As the standard image data format, JPEG and MPEG are often used for still images and moving pictures respectively. In the JPEG and MPEG formats, image data are compressed by an orthogonal transformation, such as a discrete cosine transform (DCT). When image data are decoded, the processing speed of a series of processes from "decoding" to "reduction" may be increased by performing a part of the reduction process during an inverse orthogonal transformation, such as an inverse DCT.

For example, Japanese Unexamined Patent Publication No. 2003-032482 proposes a method in which JPEG compressed image data are transformed by an inverse DCT after data in the frequency domain are selected according to a specified reduction ratio.

In the method described above, reduction of N/8 (N=1 to 7) is achieved by combining the filtering, which is to be performed in the reduction process, with the inverse orthogonal transformation. Thus, the accuracy of the reduced image data is degraded even if the processing speed is increased, or a sufficiently high processing speed is not yet achieved.

Therefore, it is an object of the present invention to provide an image processing method and apparatus capable of decoding and reducing image data in higher speed using any reduction ratio without degrading the accuracy of the reduced image data by eliminating the problems described above.

SUMMARY OF THE INVENTION

The image processing method of the present invention is an image processing method in which image data encoded with an orthogonal transformation and a variable length coding are decoded using a variable length decoding and an inverse orthogonal transformation, and resolution of the image data is transformed to a predetermined target resolution, the method comprising the steps of:

decoding the imaged data using the variable length decoding;

obtaining resolution of the image data;

comparing the obtained resolution with the target resolution, and selecting low frequency components to be used in the inverse orthogonal transformation according to the comparison result;

selecting a reduction method from the group consisting of a method using only the inverse orthogonal transformation, a combined method of the inverse orthogonal transformation with another reduction algorithm, and a method using only the another reduction algorithm according to the comparison result; and reducing the decoded image data using the selected reduction method.

The referent of "orthogonal transformation" as used herein means a process for transforming brightness data of an image into the frequency domain, and a DCT (discrete cosine transform) is one of such processes. When "image data" is in JPEG format, in particular, the DCT is used as the method of the orthogonal transformation. As for the method of "inverse orthogonal transformation", for example, an inverse DCT (inverse discrete cosine transform) is used.

Further, the transformation determinant used for the orthogonal transformation is converted such that it has more zero elements before being used according to the comparison result between the predetermined target resolution and the obtained resolution. Specific determinants will be described later.

The image processing apparatus of the present invention is an apparatus in which image data encoded with an orthogonal transformation and a variable length coding are decoded using a variable length decoding and an inverse orthogonal transformation, and resolution of the image data is transformed to a predetermined target resolution, the apparatus comprising:

a receiving means for receiving the image data;

an image processing means for decoding and reducing the image data; and a display means for displaying the image data obtained by the image processing means, wherein the image processing means comprises:

a decoding means for decoding the image data;

a resolution obtaining means for obtaining resolution of the original image represented by the image data;

a frequency selecting means for selecting low frequency components to be used for the inverse orthogonal transformation by comparing the obtained resolution with the target resolution;

an inverse transforming means for performing an inverse orthogonal transformation on the decoded image data using only the low frequency components selected by the frequency selecting means, or using all of the frequency components;

reducing means for further reducing the inverse transformed image data; and a reduction method selecting means for selecting an optimum reduction method from the group consisting of a method using only the inverse transforming means, a method using both the inverse transforming means and reducing means, and a method using only the reducing means based on the obtained resolution and the target resolution.

Here, the reduction method selecting means selects the most efficient reduction method, in terms of the amount of calculations, accuracy of the reduced image to be obtained, from the group consisting of a method using only the inverse orthogonal transformation performed on the decoded image data using only the selected frequency components, a method in which the inverse orthogonal transformation is performed on the decoded image data using only the selected frequency components, which is further reduced by another reduction method using a general reduction algorithm, and a method in which the reduction method using the general reduction algorithm is performed on the image data which have been inverse orthogonal transformed using all of the frequency components (i.e., the reduction process is performed only by the reducing means).

The method described above allows efficient decoding and reducing of image data according to resolution of the image data and predetermined resolution, thereby processing speed may be increased without degrading the accuracy of the reduced image to be obtained.

BRIEF DESCRIPTION OF THE DRAWINGS

FIG. 1 is a flow diagram illustrating the process flow of the image processing method of the present invention.

FIG. 2 is a block diagram illustrating the construction of the image processing terminal for implementing the image processing method of the present invention.

DESCRIPTION OF THE PREFERRED EMBODIMENTS

The present invention performs image processing on image data encoded with an orthogonal transformation and a variable length coding. Here, the referent of "image data encoded with an orthogonal transformation and a variable length coding" means compressed image data. That is, brightness data of the image are transformed into the frequency domain by the orthogonal transformation, and the coefficients in the frequency domain are represented by variable length codes. More specifically, the present invention is applied to cell phone terminals and the like that receive image data compressed in the manner as described above. That is, the present invention may be advantageously used, for example, for optimizing the display of an image attached to an e-mail message received by a cell phone or the like.

It is assumed that the image data are encoded using a general image compression method, such as JPEG or MPEG. Here, the present invention will be described with reference to an example case in which image data are compressed by JPEG with an 8×8 DCT are processed.

Hereinafter, preferred embodiments of the image processing apparatus and method of the present invention will be described in detail with reference to accompanying drawings. FIG. 1 shows a specific process flow of the image processing method of the present invention.

When image data encoded with an orthogonal transformation and a variable length coding are inputted, they are decoded using a variable length decoding (step 101). At the same time, resolution of the inputted image data is obtained (step 102). The resolution information may be obtained, for example, by reading out the information from the header section. After the resolution of the inputted image data is obtained, it is compared with a predetermined resolution (target resolution) to select low frequency components to be used for the inverse orthogonal transformation (step 103). Here, the target resolution is assumed to have a value which is smaller than or equal to that of the obtained resolution.

Selection of the low frequency components to be used for the inverse orthogonal transformation will be described hereinbelow.

For example, in JPEG, the format of the inputted image data is orthogonally transformed using an 8×8 DCT, so that the original image (represented by the inputted image data) may be reduced to ⅛ to ⅞ by performing the inverse orthogonal transformation on the inputted image data using a part of the DCT coefficients.

If the value of the target resolution is N/8 (N=1 to 7) of the obtained resolution, the inverse orthogonal transformation is performed using N×N low frequency components.

If the value of the target resolution is other than those values described above with respect to the obtained resolution, the value which is closest to the target value is selected from N/8 (N=1 to 7), and based on the selected value of N, N×N low frequency components to be used for the inverse orthogonal transformation are selected. For example, when image data are reduced to 7/16, the closest value is 4/8, i.e., N=4. Thus, 4×4 low frequency components are selected for use in the inverse orthogonal transformation.

Then, according to the ratio between the target and obtained resolutions, the most appropriate reduction method is selected in terms of the amount of calculations, accuracy of the reduced image to be obtained, and efficiency (step 104).

A first reduction method reduces the image data to the target resolution by performing only the inverse orthogonal transformation using the low frequency components selected in the manner as described above (step 105). This method is selected when the value of the target resolution corresponds to N/8 (N=1 to 7) of the obtained resolution.

A second reduction method reduces the image data to the target resolution using both the inverse orthogonal transformation (step 106) and a general reduction algorithm (step 107), such as a bicubic interpolation. This method is selected when the value of the target resolution is other than N/8 (N=1 to 7) with respect to the obtained resolution. For example, if the value of the target resolution is other than N/8 with respect to the obtained resolution, the inverse orthogonal transformation is performed using the low frequency components selected based on the closest value to the target resolution. This reduces the image to a resolution which is close to the target resolution, but the reduction process for reducing it to the target resolution is not yet completed. For example, when the image data are reduced to 7/16, they are reduced first to 4/8 using 4×4 low frequency components. At this point, however, the reduction process for reducing the image data to the target resolution is not yet completed. Therefore, the image data reduced to 4/8 are further reduced to the target value (7/16 in this case) using another reduction algorithm. Here, as for the reduction algorithm described above, a general reduction algorithm, such as a bicubic interpolation or the like may be used.

Depending on the target resolution value, there may be a case in which more accurate reduced image data may be obtained in more efficient way in terms of the amount of calculations by performing the inverse orthogonal transformation based on a fast inverse DCT using all of the frequency components (step 108), and then performing the reduction process using the reduction algorithm (step 109), rather than performing the inverse orthogonal transformation using the selected low frequency components to perform a part of the reduction process, and then completing the reduction process using the reduction algorithm. If that is the case, a general reduction algorithm may be used for reducing the image data to the target resolution (step 109). For example, if image data are reduced to 13/16 according to the second method, the closest value to 13/16 is 7/8, that is, N=7. Therefore, the inverse orthogonal transformation is performed using 7×7 low frequency components. Thereafter, the image data are reduced to 13/16 using the reduction algorithm. In this case, more accurate reduced image data may be obtained, or the processing speed may be increased by performing the inverse orthogonal transformation based on the fast inverse DCT algorithm using all of the frequency components of the variable length decoded image data, and then performing the reduction process using the reduction algorithm, rather than performing the reduction process using the second method described above.

The image data reduced by one of the methods described above is outputted to a display means.

Hereinafter, a specific method when the inverse orthogonal transformation is performed will be described. The method realizes fast processing by converting the determinant used for performing the inverse DCT into a matrix containing more zero elements. Fast inverse DCT algorithms according to the values of N will be described hereinbelow.

Generally, the formula for a one-dimensional inverse DCT is like that shown below.

$$f(x) = \sqrt{2/N} \left[ \sum_{u=0}^{N-1} C(u)F(u) \times \cos((2x+1)/2N)u\pi \right] \quad (1)$$

Where, f(x) is a one-dimensional sample value, f(u) is a one-dimensional DCT coefficient, and N indicates the same value as the N in the reduction ratio of N/8.

When the value of N=3, the formula may be expressed by the following determinant.

$$\begin{bmatrix} f(0) \\ f(1) \\ f(2) \end{bmatrix} = \sqrt{2/3} \begin{bmatrix} C_4^1 & C_6^1 & C_3^1 \\ C_4^1 & 0 & -1 \\ C_4^1 & -C_6^1 & C_3^1 \end{bmatrix} \begin{bmatrix} F(0) \\ F(1) \\ F(2) \end{bmatrix} \quad (2)$$

Here, the following are assumed.

$$C_p^q = \cos((q/p)\pi)$$

$$B_3 = \begin{bmatrix} C_4^1 & C_6^1 & C_3^1 \\ C_4^1 & 0 & -1 \\ C_4^1 & -C_6^1 & C_3^1 \end{bmatrix}$$

Then, the determinant may be converted to that shown below.

$$B_3 = \begin{bmatrix} 1 & 0 & -1 \\ 0 & 1 & 0 \\ 1 & 0 & 1 \end{bmatrix} \begin{bmatrix} C_4^1 & 0 & C_3^1 \\ C_4^1 & 0 & -1 \\ 0 & -C_6^1 & 0 \end{bmatrix} \quad (4)$$

It may also be converted to that shown below.

$$B_3 = \begin{bmatrix} 1 & 0 & 1 \\ 0 & 1 & 0 \\ -1 & 0 & 1 \end{bmatrix} \begin{bmatrix} 0 & C_6^1 & 0 \\ C_4^1 & 0 & -1 \\ C_4^1 & 0 & C_3^1 \end{bmatrix} \quad (5)$$

When the determinant (2) is used, 7 multiplications and 5 additions/subtractions are required for performing the inverse DCT, while only 4 multiplications and 4 additions/subtractions are required if determinant (4) or (5) is used. This is a significant increase in the calculation speed.

Similarly, the determinant used when the value of N=5, i.e., when image data are reduced to 5/8 is as shown below.

$$\begin{bmatrix} f(0) \\ f(1) \\ f(2) \\ f(3) \\ f(4) \end{bmatrix} = \sqrt{2/5} \begin{bmatrix} C_4^1 & C_5^1 & C_5^2 & C_{10}^1 & C_{10}^3 \\ C_4^1 & -C_5^2 & -C_5^1 & C_{10}^3 & -C_{10}^1 \\ C_4^1 & -1 & 1 & 0 & 0 \\ C_4^1 & -C_5^2 & -C_5^1 & -C_{10}^3 & C_{10}^1 \\ C_4^1 & C_5^1 & C_5^2 & -C_{10}^1 & -C_{10}^3 \end{bmatrix} \begin{bmatrix} F(0) \\ F(2) \\ F(4) \\ F(1) \\ F(3) \end{bmatrix} \quad (6)$$

The determinant may be converted to that shown below.

$$B_5 = \begin{bmatrix} 1 & 0 & 0 & 0 & -1 \\ 0 & 1 & 0 & -1 & 0 \\ 0 & 0 & 1 & 0 & 0 \\ 0 & 1 & 0 & 1 & 0 \\ 1 & 0 & 0 & 0 & 1 \end{bmatrix} \begin{bmatrix} C_4^1 & C_5^1 & C_5^2 & 0 & 0 \\ C_4^1 & -C_5^2 & -C_5^1 & 0 & 0 \\ C_4^1 & -1 & 1 & 0 & 0 \\ 0 & 0 & 0 & -C_{10}^3 & C_{10}^1 \\ 0 & 0 & 0 & -C_{10}^1 & -C_{10}^3 \end{bmatrix} \quad (7)$$

Here, if determinant (6) is used, 25 multiplications and 20 additions/subtractions are required for performing the inverse DCT, while only 11 multiplications and 12 additions/subtractions are required if determinant (7) is used. This is a significant increase in the calculation speed.

Similarly, the determinant used when the value of N=6, i.e., when image data are reduced to 6/8 is as shown below.

$$\begin{bmatrix} f(0) \\ f(1) \\ f(2) \\ f(3) \\ f(4) \\ f(5) \end{bmatrix} = \sqrt{1/3} \begin{bmatrix} C_4^1 & C_6^1 & C_3^1 & C_{12}^1 & C_4^1 & C_{12}^5 \\ C_4^1 & 0 & -1 & C_4^1 & -C_4^1 & -C_4^1 \\ C_4^1 & -C_6^1 & C_3^1 & C_{12}^5 & -C_4^1 & C_{12}^1 \\ C_4^1 & -C_6^1 & C_3^1 & -C_{12}^5 & C_4^1 & -C_{12}^1 \\ C_4^1 & 0 & -1 & -C_4^1 & C_4^1 & C_4^1 \\ C_4^1 & C_6^1 & C_3^1 & -C_{12}^1 & -C_4^1 & -C_{12}^5 \end{bmatrix} \begin{bmatrix} F(0) \\ F(2) \\ F(4) \\ F(1) \\ F(3) \\ F(5) \end{bmatrix} \quad (8)$$

The determinant may be converted to that shown below.

$$B_6 = \begin{bmatrix} 1 & 0 & 0 & 1 & 0 & 0 \\ 0 & 1 & 0 & 0 & 1 & 0 \\ 0 & 0 & 1 & 0 & 0 & 1 \\ 0 & 0 & 1 & 0 & 0 & -1 \\ 0 & 1 & 0 & 0 & -1 & 0 \\ 1 & 0 & 0 & -1 & 0 & 0 \end{bmatrix} \begin{bmatrix} C_4^1 & C_6^1 & C_3^1 & 0 & 0 & 0 \\ C_4^1 & 0 & -1 & 0 & 0 & 0 \\ C_4^1 & -C_6^1 & C_3^1 & 0 & 0 & 0 \\ 0 & 0 & 0 & C_{12}^1 & C_4^1 & C_{12}^5 \\ 0 & 0 & 0 & C_4^1 & -C_4^1 & C_4^1 \\ 0 & 0 & 0 & C_4^5 & -C_4^1 & C_{12}^1 \end{bmatrix} \quad (9)$$

Here, if determinant (8) is used, 36 multiplications and 30 additions/subtractions are required for performing the inverse DCT, while only 16 multiplications and 17 additions/subtractions are required if determinant (9) is used. This is a significant increase in the calculation speed.

Similarly, the determinant used when the value of N=7, i.e., when image data are reduced to 7/8 is as shown below.

$$\begin{bmatrix} f(0) \\ f(1) \\ f(2) \\ f(3) \\ f(4) \\ f(5) \\ f(6) \end{bmatrix} = \qquad (10)$$

$$\sqrt{2/7} \begin{bmatrix} C_4^1 & C_7^1 & C_7^2 & C_7^3 & C_{14}^1 & C_{14}^3 & C_{14}^5 \\ C_4^1 & C_7^3 & -C_7^1 & -C_7^2 & C_{14}^5 & -C_4^1 & -C_{14}^1 \\ C_4^1 & -C_7^2 & -C_7^3 & C_7^1 & C_4^5 & -C_{14}^1 & C_{14}^3 \\ C_4^1 & -1 & 1 & -1 & 0 & 0 & 0 \\ C_4^1 & -C_7^2 & -C_7^3 & C_7^1 & -C_{14}^5 & C_{14}^1 & -C_{14}^3 \\ C_4^1 & C_7^3 & -C_7^1 & -C_7^2 & -C_{14}^3 & C_{14}^5 & C_{14}^1 \\ C_4^1 & C_7^1 & C_7^2 & C_7^3 & -C_{14}^1 & -C_{14}^3 & -C_{14}^5 \end{bmatrix} \begin{bmatrix} F(0) \\ F(2) \\ F(4) \\ F(6) \\ F(1) \\ F(3) \\ F(5) \end{bmatrix}$$

The determinant may be converted to that shown below.

$$B_7 = \begin{bmatrix} 1 & 0 & 0 & 0 & 0 & 0 & 1 \\ 0 & 1 & 0 & 0 & 0 & -1 & 0 \\ 0 & 0 & 1 & 0 & -1 & 0 & 0 \\ 0 & 0 & 0 & 1 & 0 & 0 & 0 \\ 0 & 0 & 1 & 0 & 1 & 0 & 0 \\ 0 & 1 & 0 & 0 & 0 & 1 & 0 \\ 1 & 0 & 0 & 0 & 0 & 0 & 1 \end{bmatrix} \qquad (11)$$

$$\begin{bmatrix} C_4^1 & C_7^1 & C_7^2 & C_7^3 & 0 & 0 & 0 \\ C_1^4 & C_7^3 & -C_7^1 & -C_7^2 & 0 & 0 & 0 \\ C_4^1 & -C_7^2 & -C_7^3 & C_7^1 & 0 & 0 & 0 \\ C_4^1 & -1 & 1 & -1 & 0 & 0 & 0 \\ 0 & 0 & 0 & 0 & -C_{14}^5 & C_{14}^1 & -C_{14}^3 \\ 0 & 0 & 0 & 0 & -C_{14}^3 & C_{14}^5 & C_{14}^1 \\ 0 & 0 & 0 & 0 & -C_{14}^1 & -C_{14}^3 & -C_{14}^5 \end{bmatrix}$$

Here, if determinant (10) is used, 49 multiplications and 42 additions/subtractions are required for performing the inverse DCT, while only 22 multiplications and 24 additions/subtractions are required if determinant (11) is used. This is a significant increase in the calculation speed.

The use of the modified determinant when the value of N is 3, 5, 6, or 7 described above allows a fast inverse DCT. When the value of N is 1, 2 or 4, a general fast inverse DCT algorithm may be used.

So far, the image processing method of the present invention has been described. Hereinafter, the structure of an image processing apparatus for implementing an embodiment of the image processing method of the present invention will be described in detail. Specifically, the image processing apparatus of the present invention may be implemented in a cell phone terminal capable of sending/receiving an e-mail message with an image attached thereto and displaying it on the screen, a personal computer, or a printer having a display means.

An image processing apparatus 1 of the present invention includes at least a receiving means 10 for receiving "image data encoded with an orthogonal transformation and a variable length coding", an image processing means 20 for decoding and reducing the received image data, and a display means 30 for displaying the processed image data.

Here, the receiving means 10 is a means for accepting image data compressed in JPEG or MPEG format, which is inputted thereto or received thereby.

The image processing means 20 includes a decoding means 201 for performing a variable length decoding on the received image data; a resolution obtaining means 202 for obtaining the number of pixels, i.e., resolution of the original image from the header section of the received image data or the like; a frequency selecting means 203 for selecting low frequency components to be used for the inverse orthogonal transformation by comparing the obtained resolution of the original image with a target resolution predetermined based on the number of pixels displayable on the display means 30; a reduction method selecting means 204 for selecting an optimum reduction method; an inverse transforming means 205 for performing an inverse orthogonal transformation on the decoded image data decoded by the decoding means using the low frequency components selected by the frequency selecting means 203; and a reducing means 206 for reducing the inverse transformed image data using a general reduction algorithm.

Here, if the received image data are, for example, in JPEG format, the image data are orthogonally transformed using an 8×8 pixel DCT, it is possible to reduce the image to ⅛ to ⅞ of the original image (represented by the inputted image data) by performing an inverse orthogonal transformation using a part of the DCT coefficients.

Accordingly, if the target resolution corresponds to N/8 (N=1 to 7) of the obtained resolution, the frequency selecting means 203 is set such that the inverse orthogonal transformation is performed using N×N low frequency components. If the value of the target resolution is other than N/8 (N=1 to 7) with respect to the obtained resolution, the value which is closest to one of the values described above is selected, and based on the selected value of N, N×N low frequency components to be used for the inverse orthogonal transformation are selected. For example, if the image is reduced to 7/16, the closest value is 4/8, i.e., N=4. Thus, 4×4 low frequency components are selected for use in the inverse orthogonal transformation.

Then, according to the obtained and target resolutions, the most appropriate reduction method is selected by the reduction method selecting means 204 by taking into account the amount of calculations, accuracy of the reduced image data, efficiency, and the like.

More specifically, if the value of the target resolution is N/8 of the obtained resolution, only the inverse orthogonal transformation is performed by the inverse transforming means 205 using the low frequency components selected by the frequency selecting means 203.

If the value of the target resolution is other than N/8 with respect to the obtained resolution, an inverse orthogonal transformation is performed by the inverse transforming means 205 using the low frequency components selected by the frequency selecting means 203 to reduce the image data to a resolution close to the target resolution. Then, the reduced image data are further reduced to the target resolution by the reducing means 206. For example, when the target resolution is 7/16 of the obtained resolution, the closest value to 7/16 is 4/8, i.e., N=4. Thus, the inverse orthogonal transformation using 4×4 low frequency components is performed to reduce the image data to 4/8. Then the image data reduced to 4/8 are further reduced to the intended value of 7/16 using the general reduction algorithm, such as a bicubic interpolation or the like.

There may be a case in which more accurate reduced image data may be obtained in more efficient way in terms of the amount of calculations if the reduction process is performed only by the reducing means 206. In such a case, the inverse orthogonal transformation based on the fast inverse DCT algorithm using all of the frequency components is performed by the inverse transforming means 205, and the reduction process is performed only by the reducing means 206. For example, when the target resolution is 13/16 of the obtained resolution, more accurate reduced image data may be obtained in more efficient way in terms of the amount of calculations by performing the fast inverse orthogonal transformation using all of the frequency components, and then performing the reduction process using the reducing means 206, rather than performing the inverse orthogonal transformation using 7×7 low frequency components (N=7) to perform a part of the reduction process, and then completing the reduction process using the general reduction algorithm.

The reduction method determining means 204 selects the most appropriate method from the reduction methods described above, and assign the image data decoded by the decoding means 201 to the selected method.

The inverse transforming means 205 performs an inverse orthogonal transformation on the variable length decoded image data using the low frequency components selected by the frequency selecting means 203 as described above. At this point, the image data are reduced to the target resolution or to a resolution close to the target resolution. Here, the inverse transforming means 205 performs an inverse orthogonal transformation on the decoded image data using the following determinants according to the value of N, i.e., the selected low frequency components.

That is, if the value of N is 3, 5, 6, or 7, an inverse orthogonal transformation is performed using the determinant (4) or (5), (7), (9), or (11) respectively. If the value of N is 1, 2, or 4, an inverse orthogonal transformation is performed using a general fast inverse DCT algorithm.

The reducing means 206 performs a general reduction algorithm, such as a bicubic interpolation or the like. It is a means for further reducing the image data, which have been reduced to a resolution close to the target resolution, to the target resolution, or reducing image data, on which a fast inverse orthogonal transformation have been performed with the resolution of the original image being maintained, to the target resolution. For example, when image data are reduced to 7/16, the closest value is 4/8, i.e., N=4. Thus, 4×4 low frequency components are selected for use in the inverse orthogonal transformation. Then the image data are reduced to 4/8 when the inverse orthogonal transformation is performed by the inverse transforming means 205 using only the selected low frequency components. The image data reduced to 4/8 are further reduced to 7/16 by the reducing means 206 using a general reduction algorithm. Alternatively, depending on the value of the target resolution, the image data may be reduced only by the reducing means 206 without subjected to the reduction process of the inverse transforming means 205 (i.e., image data are inverse orthogonal transformed by the inverse transforming means 205 using all of the frequency components) As already described, when image data are reduced, for example, to 13/16, more accurate reduced image data may be obtained in more efficient way with less amount of calculations by performing the fast inverse orthogonal transformation on the variable length decoded image data using all of the frequency components, which are then reduced to the target resolution by the reducing means 206, rather than performing a part of the reduction process in the inverse transforming means 205.

The image processing method and apparatus of the present invention described above allows faster reduction of any image data to any resolution without degrading the accuracy of the reduced image data.

The image processing method and apparatus of the present invention is not limited to the image data in JPEG compressed format, but applicable to those in other compressed formats, such as MPEG or the like. In this case, an appropriate inverse orthogonal transformation method is used according to the image data format used.

Further, in the embodiment, a cell phone is described as an example apparatus for implementing the image processing method of the present invention, but the image processing method of the present invention may also be implemented in a personal computer, a printer having a display means, a digital camera, and the like.

It should be appreciated that each of the embodiments described above is provided only for illustrating purposes and the technical scope of the present invention is defined only by the appended claims.

What is claimed is:

1. An image processing method in which image data encoded with an orthogonal transformation and a variable length coding are decoded using a variable length decoding and an inverse orthogonal transformation, and resolution of the image data is transformed to a predetermined target resolution, the method comprising the steps of:
    decoding the imaged data using the variable length decoding;
    obtaining resolution of the image data;
    comparing the obtained resolution with the target resolution, and selecting low frequency components to be used in the inverse orthogonal transformation according to the comparison result;
    selecting a reduction method from the group consisting of a method using only the inverse orthogonal transformation, a combined method of the inverse orthogonal transformation with another reduction algorithm, and a method using only the another reduction algorithm according to the comparison result; and
    reducing the decoded image data using the selected reduction method.

2. The image processing method according to claim 1, wherein the inverse orthogonal transformation uses only the selected low frequency components and a determinant that allows fast processing.

3. The image processing method according to claim 2, wherein when the image data are image data orthogonally transformed by an 8×8 pixel DCT and encoded by a variable length coding, and the target resolution is N/8 of the obtained resolution,
    N×N low frequency components are selected as the low frequency components used for the inverse orthogonal transformation, and
    the determinant that allows fast processing is determined according to the value of N.

4. The image processing method according to claim 3, wherein assuming that the determinant is $B_3$ when the value of N=3, and $$C_p^q = \cos((q/p)\pi),$$

the determinant $B_3$ satisfies:

$$B_3 = \begin{bmatrix} C_4^1 & C_6^1 & C_3^1 \\ C_4^1 & 0 & -1 \\ C_4^1 & -C_6^1 & C_3^1 \end{bmatrix}$$

or $$B_3 = \begin{bmatrix} 1 & 0 & -1 \\ 0 & 1 & 0 \\ 1 & 0 & 1 \end{bmatrix} \begin{bmatrix} C_4^1 & 0 & C_3^1 \\ C_4^1 & 0 & -1 \\ 0 & -C_6^1 & 0 \end{bmatrix}.$$

5. The image processing method according to claim 3, wherein assuming that the determinant is $B_5$ when the value of N=5, and $C_p^q = \cos((q/p)\pi)$, the determinant $B_5$ satisfies:

$$B_5 = \begin{bmatrix} 1 & 0 & 0 & 0 & -1 \\ 0 & 1 & 0 & -1 & 0 \\ 0 & 0 & 1 & 0 & 0 \\ 0 & 1 & 0 & 1 & 0 \\ 1 & 0 & 0 & 0 & 1 \end{bmatrix} \begin{bmatrix} C_4^1 & C_5^1 & C_5^2 & 0 & 0 \\ C_4^1 & -C_5^2 & -C_5^1 & 0 & 0 \\ C_4^1 & -1 & 1 & 0 & 0 \\ 0 & 0 & 0 & -C_{10}^3 & C_{10}^1 \\ 0 & 0 & 0 & -C_{10}^1 & -C_{10}^3 \end{bmatrix}.$$

6. The image processing method according to claim 3, wherein assuming that the determinant is $B_6$ when the value of N=6, and $C_p^q = \cos((q/p)\pi)$, the determinant $B_6$ satisfies:

$$B_6 = \begin{bmatrix} 1 & 0 & 0 & 1 & 0 & 0 \\ 0 & 1 & 0 & 0 & 1 & 0 \\ 0 & 0 & 1 & 0 & 0 & 1 \\ 0 & 0 & 1 & 0 & 0 & -1 \\ 0 & 1 & 0 & 0 & -1 & 0 \\ 1 & 0 & 0 & -1 & 0 & 0 \end{bmatrix} \begin{bmatrix} C_4^1 & C_6^1 & C_3^1 & 0 & 0 & 0 \\ C_4^1 & 0 & -1 & 0 & 0 & 0 \\ C_4^1 & -C_6^1 & C_3^1 & 0 & 0 & 0 \\ 0 & 0 & 0 & C_{12}^1 & C_4^1 & C_{12}^5 \\ 0 & 0 & 0 & C_4^1 & -C_4^1 & C_4^1 \\ 0 & 0 & 0 & C_4^5 & -C_4^1 & C_{12}^1 \end{bmatrix}.$$

7. The image processing method according to claim 3, wherein assuming that the determinant is $B_7$ when the value of N=7, and $C_p^q = \cos((q/p)\pi)$, the determinant $B_7$ satisfies:

$$B_7 = \begin{bmatrix} 1 & 0 & 0 & 0 & 0 & 0 & 1 \\ 0 & 1 & 0 & 0 & 0 & -1 & 0 \\ 0 & 0 & 1 & 0 & -1 & 0 & 0 \\ 0 & 0 & 0 & 1 & 0 & 0 & 0 \\ 0 & 0 & 1 & 0 & 1 & 0 & 0 \\ 0 & 1 & 0 & 0 & 0 & 1 & 0 \\ 1 & 0 & 0 & 0 & 0 & 0 & 1 \end{bmatrix}$$

$$\begin{bmatrix} C_4^1 & C_7^1 & C_7^2 & C_7^3 & 0 & 0 & 0 \\ C_4^1 & C_7^3 & -C_7^1 & -C_7^2 & 0 & 0 & 0 \\ C_4^1 & -C_7^2 & -C_7^3 & C_7^1 & 0 & 0 & 0 \\ C_4^1 & -1 & 1 & -1 & 0 & 0 & 0 \\ 0 & 0 & 0 & 0 & -C_{14}^5 & C_{14}^1 & -C_{14}^3 \\ 0 & 0 & 0 & 0 & -C_{14}^3 & C_{14}^5 & C_{14}^1 \\ 0 & 0 & 0 & 0 & -C_{14}^1 & -c_{14}^3 & -C_{14}^5 \end{bmatrix}.$$

8. An image processing apparatus in which image data encoded with an orthogonal transformation and a variable length coding are decoded using a variable length decoding and an inverse orthogonal transformation, and resolution of the image data is transformed to a predetermined target resolution, the apparatus comprising:

a receiving means for receiving the image data;

an image processing means for decoding and reducing the image data; and a display means for displaying the image data obtained by the image processing means, wherein the image processing means comprises:

a decoding means for decoding the image data;

a resolution obtaining means for obtaining resolution of the original image represented by the image data;

a frequency selecting means for selecting low frequency components to be used for the inverse orthogonal transformation by comparing the obtained resolution with the target resolution;

an inverse transforming means for performing an inverse orthogonal transformation on the decoded image data using only the low frequency components selected by the frequency selecting means, or using all of the frequency components;

reducing means for further reducing the inverse transformed image data; and a reduction method selecting means for selecting an optimum reduction method from the group consisting of a method using only the inverse transforming means, a method using both the inverse transforming means and reducing means, and a method using only the reducing means based on the obtained resolution and the target resolution.

9. The image processing apparatus according to claim 8, wherein the inverse transforming means performs the inverse orthogonal transformation using a determinant which is determined according to the ratio between the target and obtained resolutions.

\* \* \* \* \*